(12) United States Patent
Hu et al.

(10) Patent No.: US 12,557,515 B2
(45) Date of Patent: Feb. 17, 2026

(54) DISPLAY PANEL AND DISPLAY DEVICE

(71) Applicants: Chengdu BOE Optoelectronics Technology Co., Ltd., Chengdu (CN); BOE TECHNOLOGY GROUP CO., LTD., Beijing (CN)

(72) Inventors: Yao Hu, Beijing (CN); Yingsong Xu, Beijing (CN); Xilei Cao, Beijing (CN); Hongli Wang, Beijing (CN)

(73) Assignees: Chengdu BOE Optoelectronics Technology Co., Ltd., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 350 days.

(21) Appl. No.: 18/265,519

(22) PCT Filed: Aug. 24, 2022

(86) PCT No.: PCT/CN2022/114531
§ 371 (c)(1),
(2) Date: Jun. 6, 2023

(87) PCT Pub. No.: WO2023/051110
PCT Pub. Date: Apr. 6, 2023

(65) Prior Publication Data
US 2024/0040878 A1 Feb. 1, 2024

(30) Foreign Application Priority Data

Sep. 29, 2021 (CN) .......................... 202111153976.9

(51) Int. Cl.
*H10K 59/35* (2023.01)
*H10K 59/12* (2023.01)
(52) U.S. Cl.
CPC ......... *H10K 59/353* (2023.02); *H10K 59/352* (2023.02); *H10K 59/12* (2023.02)

(58) Field of Classification Search
CPC .... H10K 59/353; H10K 59/352; H10K 59/12; H10K 59/351
See application file for complete search history.

(56) References Cited

U.S. PATENT DOCUMENTS 10,776,603 B2 9/2020 Ma et al.
11,342,384 B2 5/2022 Wang et al.
(Continued)

FOREIGN PATENT DOCUMENTS

| CN | 107644888 A | 1/2018 |
|----|-------------|--------|
| CN | 108922469 A | 11/2018 |

(Continued)

OTHER PUBLICATIONS

English Machine Translation of Chen CN 112786645-A (Year: 2025).*

(Continued)

*Primary Examiner* — Donald L Raleigh
(74) *Attorney, Agent, or Firm* — Collard & Roe, P.C.

(57) ABSTRACT

A display panel and a display device are provided. The display panel includes a plurality of sub-pixels, each of the plurality of sub-pixels includes a light-emitting region, the plurality of sub-pixels include a plurality of first color sub-pixels, the first color sub-pixel includes a first light-emitting layer to emit a first color light. The plurality of first color sub-pixels include a plurality of first sub-pixel pairs, each of the plurality of first sub-pixel pairs includes two first color sub-pixels arranged along a first direction, first light-emitting layers of the two first color sub-pixels in each first sub-pixel pair are integrated, light-emitting regions of the two first color sub-pixels in at least one first sub-pixel pair are distributed asymmetrically with respect to any straight line extending along a second direction, and the second direction is perpendicular to the first direction.

20 Claims, 6 Drawing Sheets

(56) References Cited

U.S. PATENT DOCUMENTS

| | | | | |
|---|---|---|---|---|
| 2006/0138941 A1* | 6/2006 | Wittmann | ............ | H10K 59/871 |
| | | | | 313/504 |
| 2010/0270912 A1* | 10/2010 | Ko | ....................... | H10K 59/353 |
| | | | | 313/504 |
| 2020/0142265 A1 | 5/2020 | Zhao et al. | | |
| 2020/0194512 A1 | 6/2020 | Wang | | |
| 2020/0395418 A1 | 12/2020 | Han et al. | | |
| 2021/0233966 A1 | 7/2021 | Xu et al. | | |
| 2022/0392963 A1* | 12/2022 | Chen | ........................ | G09G 3/20 |
| 2023/0157146 A1 | 5/2023 | Han | | |

FOREIGN PATENT DOCUMENTS

| | | | | |
|---|---|---|---|---|
| CN | 109994508 A | 7/2019 | | |
| CN | 110133885 A | 8/2019 | | |
| CN | 111243442 A | 6/2020 | | |
| CN | 111837238 A | 10/2020 | | |
| CN | 112786645 A * | 5/2021 | ......... | H10K 59/8792 |
| CN | 113013222 A | 6/2021 | | |
| CN | 216288464 U | 4/2022 | | |
| WO | 2020/199083 A1 | 10/2020 | | |

OTHER PUBLICATIONS

International Search Report in PCT/CN2022/114531 in Chinese dated Oct. 26, 2022 with English translation.

Written Opinion in n PCT/CN2022/114531 in Chinese dated Oct. 26, 2022.

Written Opinion of the International Search Authority in PCT/CN2022/114531 dated Oct. 26, 2022 with English translation.

* cited by examiner

DISPLAY PANEL AND DISPLAY DEVICE

CROSS REFERENCE TO RELATED APPLICATIONS

This application is the National Stage of PCT/CN2022/114531 filed on Aug. 24, 2022, which claims priority under 35 U.S.C. § 119 of Chinese Application No. 202111153976.9 filed on Sep. 29, 2021, the disclosure of which is incorporated by reference.

TECHNICAL FIELD

At least one embodiment of the present disclosure relates to a display panel and a display device.

BACKGROUND

Organic light-emitting diode (OLED) display panels have attracted wide attention due to advantages of thinness, flexibility, gorgeous color, high contrast and fast response, etc., and have gradually replaced liquid crystal display panels. At present, high PPI (Pixels Per Inch, representing pixel density) display is the development trend of OLED display technology.

SUMMARY

At least one embodiment of the present disclosure provides a display panel and a display device.

At least one embodiment of the present disclosure provides a display panel including a plurality of sub-pixels. Each of the plurality of sub-pixels includes a light-emitting region, the plurality of sub-pixels include a plurality of first color sub-pixels, the first color sub-pixel includes a first light-emitting layer to emit a first color light. The plurality of first color sub-pixels include a plurality of first sub-pixel pairs, each of the plurality of first sub-pixel pairs includes two first color sub-pixels arranged along a first direction, first light-emitting layers of the two first color sub-pixels in each first sub-pixel pair are integrated, light-emitting regions of the two first color sub-pixels in at least one first sub-pixel pair are distributed asymmetrically with respect to any straight line extending along a second direction, and the second direction is perpendicular to the first direction.

For example, according to an embodiment of the present application, the first color sub-pixel is a green sub-pixel, and the first color light is a green light.

For example, according to an embodiment of the present application, the display panel includes a plurality of first pixel groups, each of the plurality of first pixel groups includes first sub-pixel pairs arranged along the first direction, the plurality of first pixel groups are arranged along the second direction, and two adjacent first pixel groups are offset with respect to each other in the first direction; a distance between the light-emitting regions of two adjacent first sub-pixel pairs arranged along the first direction is a first distance, a distance between the light-emitting regions of the two first color sub-pixels in each first sub-pixel pair is a second distance, and the first distance is greater than the second distance.

For example, according to an embodiment of the present application, in at least a part of the first sub-pixel pairs, the light-emitting regions of the two first color sub-pixels have a same shape, the light-emitting region of each first color sub-pixel includes a first sub-region and a second sub-region connected with each other, the first sub-region and the second sub-region are arranged along the first direction, the first sub-region and the second sub-region have a same maximum size in the first direction, and the first sub-region and the second sub-region have different shapes.

For example, according to an embodiment of the present application, in the light-emitting region of the first color sub-pixel, an area of the first sub-region is smaller than an area of the second sub-region.

For example, according to an embodiment of the present application, in the first sub-pixel pair, the light-emitting regions of the two first color sub-pixels have a same arrangement direction of the first sub-region and the second sub-region.

For example, according to an embodiment of the present application, in one of two first sub-pixel pairs adjacent in the first direction, the arrangement directions of the first sub-region and the second sub-region in the light-emitting regions of the two first color sub-pixels are both first arrangement directions; and in the other of the two adjacent first sub-pixel pairs, the arrangement directions of the first sub-region and the second sub-region in the light-emitting regions of the two first color sub-pixels are both second arrangement directions, and an included angle between a first arrangement direction and a second arrangement direction is greater than 120 degrees.

For example, according to an embodiment of the present application, in two first sub-pixel pairs adjacent in the first direction, the arrangement directions of the first sub-region and the second sub-region in the light-emitting regions of all first color sub-pixels are the same.

For example, according to an embodiment of the present application, the display panel includes a plurality of first pixel groups, and each of the plurality of first pixel groups includes first sub-pixel pairs arranged along the first direction; in at least a part of the first sub-pixel pairs, the light-emitting regions of the two first color sub-pixels have a same shape, the light-emitting region of each first color sub-pixel includes a first sub-region and a second sub-region connected with each other, the first sub-region and the second sub-region are arranged along the first direction, the first sub-region and the second sub-region have a same maximum size in the first direction, and an area of the first sub-region is smaller than an area of the second sub-region; in one of two first sub-pixel pairs adjacent in the first direction, the arrangement directions of the first sub-region and the second sub-region in the light-emitting regions of the two first color sub-pixels are both first arrangement directions; and in the other of the two adjacent first sub-pixel pairs, the arrangement directions of the first sub-region and the second sub-region in the light-emitting regions of the two first color sub-pixels are both second arrangement directions, and an included angle between a first arrangement direction and a second arrangement direction is greater than 120 degrees; in at least one first pixel group, in a case where two sub-regions close to each other in two adjacent first sub-pixel pairs are two first sub-regions, a distance between the two first sub-regions close to each other is a first sub-distance, and in a case where two sub-regions close to each other in two adjacent first sub-pixel pairs are two second sub-regions, a distance between the two second sub-regions close to each other is a second sub-distance, and the first sub-distance is less than the second sub-distance.

For example, according to an embodiment of the present application, the shape of the light-emitting region of each first color sub-pixel includes a pentagon, an end of the first sub-region farthest from the second sub-region includes a vertex of a corner of the pentagon, and an end of the second sub-region farthest from the first sub-region includes a side of the pentagon.

For example, according to an embodiment of the present application, a maximum size of the light-emitting region of each first color sub-pixel in the first direction is a first size, a maximum size of the light-emitting region of each first color sub-pixel in the second direction is a second size, and the first size is greater than the second size.

For example, according to an embodiment of the present application, the display panel further includes a spacer, disposed at a gap between the light-emitting regions of two first sub-pixel pairs adjacent in the first direction.

For example, according to an embodiment of the present application, the display panel further includes a spacer, disposed at a gap between the two second sub-regions close to each other in two adjacent first sub-pixel pairs.

For example, according to an embodiment of the present application, the plurality of sub-pixels further include a plurality of second color sub-pixels and a plurality of third color sub-pixels. The display panel further includes a plurality of second pixel groups, each of the plurality of second pixel groups includes second color sub-pixels and third color sub-pixels arranged along the first direction, the plurality of first pixel groups and the plurality of second pixel groups are alternately arranged along the second direction, and two adjacent second pixel groups are offset with respect to each other in the first direction; the second color sub-pixel includes a second light-emitting layer to emit a second color light, and the third color sub-pixel includes a third light-emitting layer to emit a third color light; the plurality of second color sub-pixels include a plurality of second sub-pixel pairs, each of the plurality of second sub-pixel pairs includes two second color sub-pixels arranged along the first direction, and second light-emitting layers of the two second color sub-pixels in each second sub-pixel pair are integrated; the plurality of third color sub-pixels include a plurality of third sub-pixel pairs, each of the plurality of third sub-pixel pairs includes two third color sub-pixels arranged along the first direction, and third light-emitting layers of the two third color sub-pixels in each third sub-pixel pair are integrated; in each second pixel group, the second sub-pixel pairs and the third sub-pixel pairs are alternately arranged along the first direction.

For example, according to an embodiment of the present application, in each second sub-pixel pair, the light-emitting regions of the two second color sub-pixels are symmetrically distributed with respect to a first symmetry axis extending along the second direction; and/or, in each third sub-pixel pair, the light-emitting regions of two third color sub-pixels are symmetrically distributed with respect to a second symmetry axis extending along the second direction.

For example, according to an embodiment of the present application, shapes of the light-emitting regions of the second color sub-pixel and the third color sub-pixel are both pentagons; in the second sub-pixel pair, the light-emitting regions of the two second sub-pixels have two corners opposite to each other; in the third sub-pixel pair, the light-emitting regions of the two third color sub-pixels have two edges opposite to each other; an edge of one of two light-emitting regions is opposite to a corner of the other of the two light-emitting regions, and the two light-emitting regions are the light-emitting region of the second color sub-pixel and the light-emitting region of the third color sub-pixel adjacent to each other in the first direction.

For example, according to an embodiment of the present application, the first pixel group and the second pixel group which are adjacent to each other are shifted in the first direction, and a straight line extending along the second direction passes through the light-emitting region of the first color sub-pixel and a gap between the light-emitting regions of the second color sub-pixel and the third color sub-pixel arranged along the first direction and adjacent to each other.

For example, according to an embodiment of the present application, the display panel further includes a base substrate on which the plurality of sub-pixels are located. Each of the plurality of sub-pixels includes an electrode located at one side of the light-emitting layer facing the base substrate, and a pixel circuit electrically connected with the electrode; an insulating layer is disposed between the pixel circuit and the electrode, and the electrode is electrically connected with the pixel circuit through a via hole located in the insulating layer.

For example, according to an embodiment of the present application, in the first color sub-pixel, a portion of the electrode overlapping with the light-emitting layer is electrically connected with the pixel circuit through the via hole; in the second color sub-pixel, a portion of the electrode not overlapping with the light-emitting layer is electrically connected with the pixel circuit through the via hole; in the third color sub-pixel, a portion of the electrode not overlapping with the light-emitting layer is electrically connected with the pixel circuit through the via hole.

For example, according to an embodiment of the present application, in each of the second color sub-pixel and the third color sub-pixel, the electrode includes a main portion and a connection portion which are connected with each other, the main portion overlaps with the light-emitting layer, and the connection portion does not overlap with the corresponding light-emitting layer and is connected with the pixel circuit; in the second sub-pixel pair, the connection portion is located at a side of the main portion connected with the connection portion away from a center of the sub-pixel pair; in the third sub-pixel pair, the connection portion is located at a side of the main portion connected with the connection portion away from a center of the sub-pixel pair.

For example, according to an embodiment of the present application, a plurality of pixel circuits arranged along the second direction are electrically connected with the connection portion of the third color sub-pixel, the connection portion of the second color sub-pixel and the electrode of the first color sub-pixel in sequence; or, a plurality of pixel circuits arranged along the second direction are electrically connected with the connection portion of the second color sub-pixel, the connection portion of the third color sub-pixel and the electrode of the first color sub-pixel in sequence.

For example, according to an embodiment of the present application, in the first direction, a distance between the light-emitting regions of the second sub-pixel pair and the third sub-pixel pair adjacent to each other is a third distance, a distance between the light-emitting regions of the two second color sub-pixels in each second sub-pixel pair is a fourth distance, a distance between the light-emitting regions of the two third color sub-pixels in each third sub-pixel pair is a fifth distance, and both the fourth distance and the fifth distance are less than the third distance.

For example, according to an embodiment of the present application, the third distance is less than the first distance.

For example, according to an embodiment of the present application, one of the second color sub-pixel and the third color sub-pixel is a red sub-pixel, and the other of the second color sub-pixel and the third color sub-pixel is a blue sub-pixel.

At least one embodiment of the present disclosure provides a display device, including the display panel as mentioned above.

BRIEF DESCRIPTION OF DRAWINGS

In order to clearly illustrate the technical solution of the embodiments of the invention, the drawings of the embodiments will be briefly described in the following; it is obvious that the described drawings are only related to some embodiments of the present disclosure and thus are not limitative of the present disclosure.

DETAILED DESCRIPTION

Figure 1:
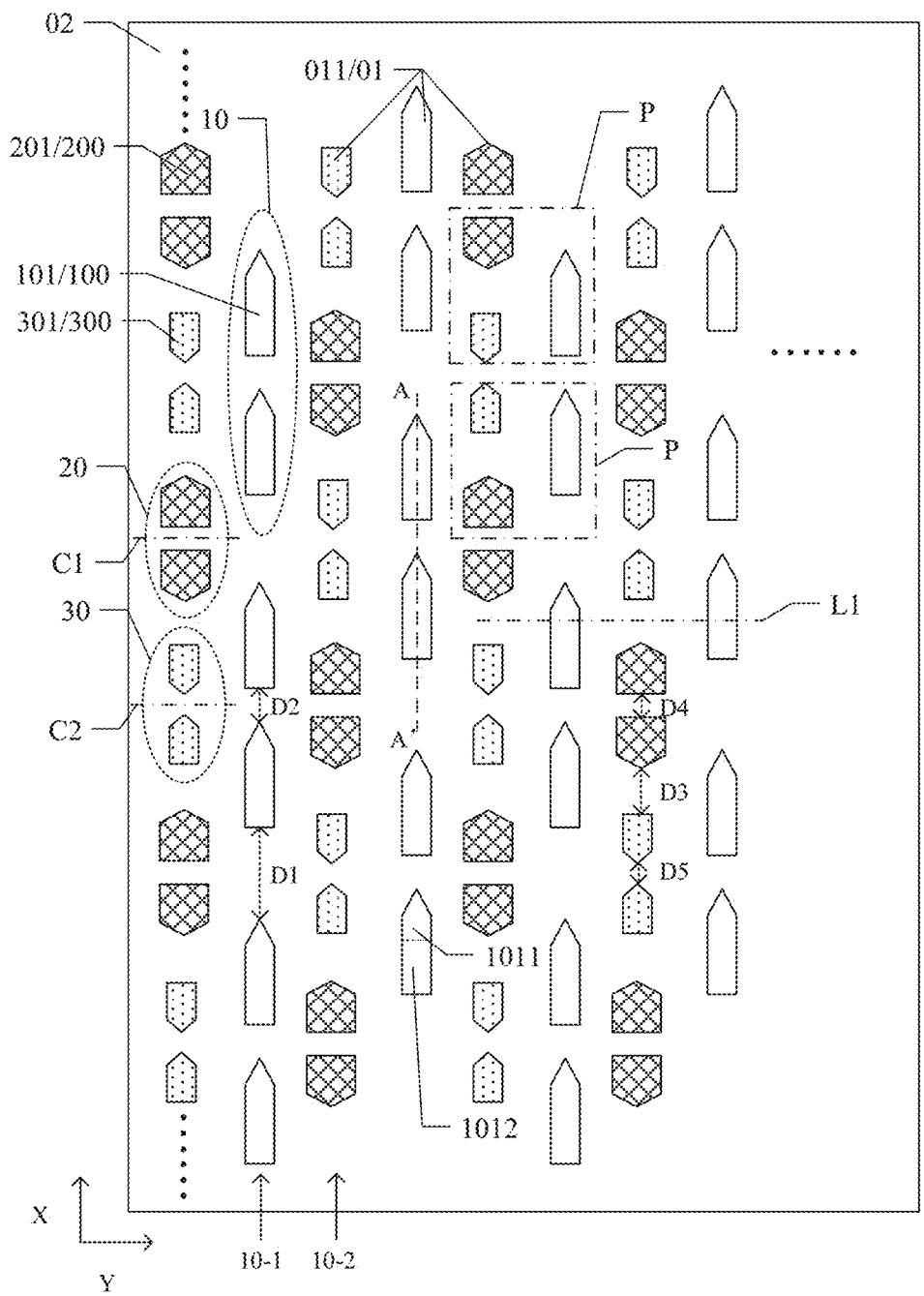
FIG. 1 is a planar structural view of a partial pixel arrangement structure of a display panel provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects.

In research, the inventor(s) of the present application have noticed that the organic light-emitting diode display panel includes a plurality of sub-pixels emitting different colors of light, and it is necessary to obtain a required light by configuring the brightness of the sub-pixels emitting different colors of light. An organic light-emitting diode display panel emits the required light through sub-pixels emitting red light, sub-pixels emitting green light and sub-pixels emitting blue light, so the distance between two adjacent sub-pixels will directly affect the quality of the picture displayed by the display panel.

Embodiments of the present disclosure provide a display panel and a display device. The display panel includes a plurality of sub-pixels, each sub-pixel includes a light-emitting region, the plurality of sub-pixels include a plurality of first color sub-pixels, and the first color sub-pixel includes a first light-emitting layer to emit a first color light. The plurality of first color sub-pixels include a plurality of first sub-pixel pairs, each first sub-pixel pair includes two first color sub-pixels arranged along a first direction, first light-emitting layers of the two first color sub-pixels in each first sub-pixel pair are integrated, and the light-emitting regions of the two first color sub-pixels in at least one first sub-pixel pair are distributed asymmetrically. The embodiment of the present disclosure provides a pixel arrangement structure, the first light-emitting layers of the two first color sub-pixels in the first sub-pixel pair of the pixel arrangement structure are integrated, and the light-emitting regions of the two first color sub-pixels in the first sub-pixel pair are distributed asymmetrically with respect to any straight line extending along a second direction, which is beneficial to increase the pixels per inch of the display panel and to adjust the brightness center of a pixel including sub-pixels of different colors to improve the uniformity of color distribution of the display panel.

The display panel and the display device provided by the embodiments of the present disclosure are described below with reference to the accompanying drawings.

Figure 2:
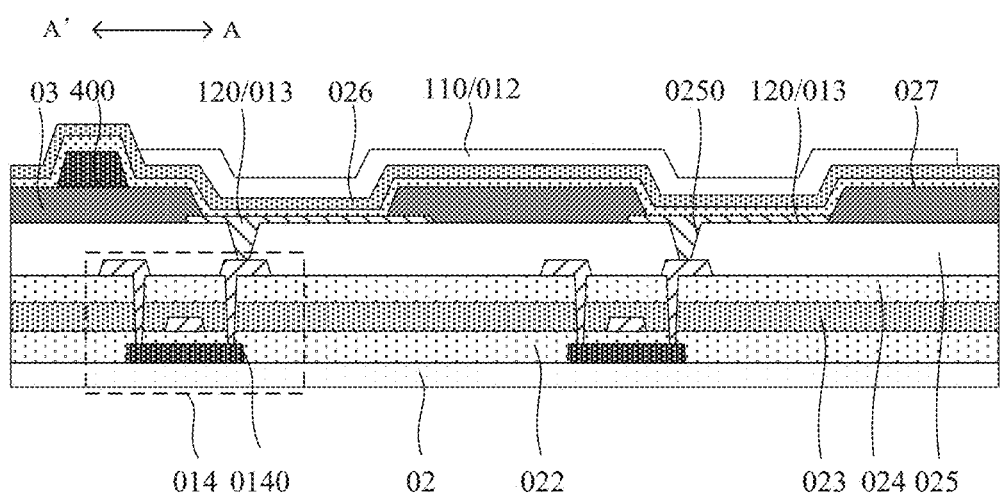
FIG. 2 is a partial cross-sectional structural view taken along line AA' as shown in FIG. 3.
Figure 3:
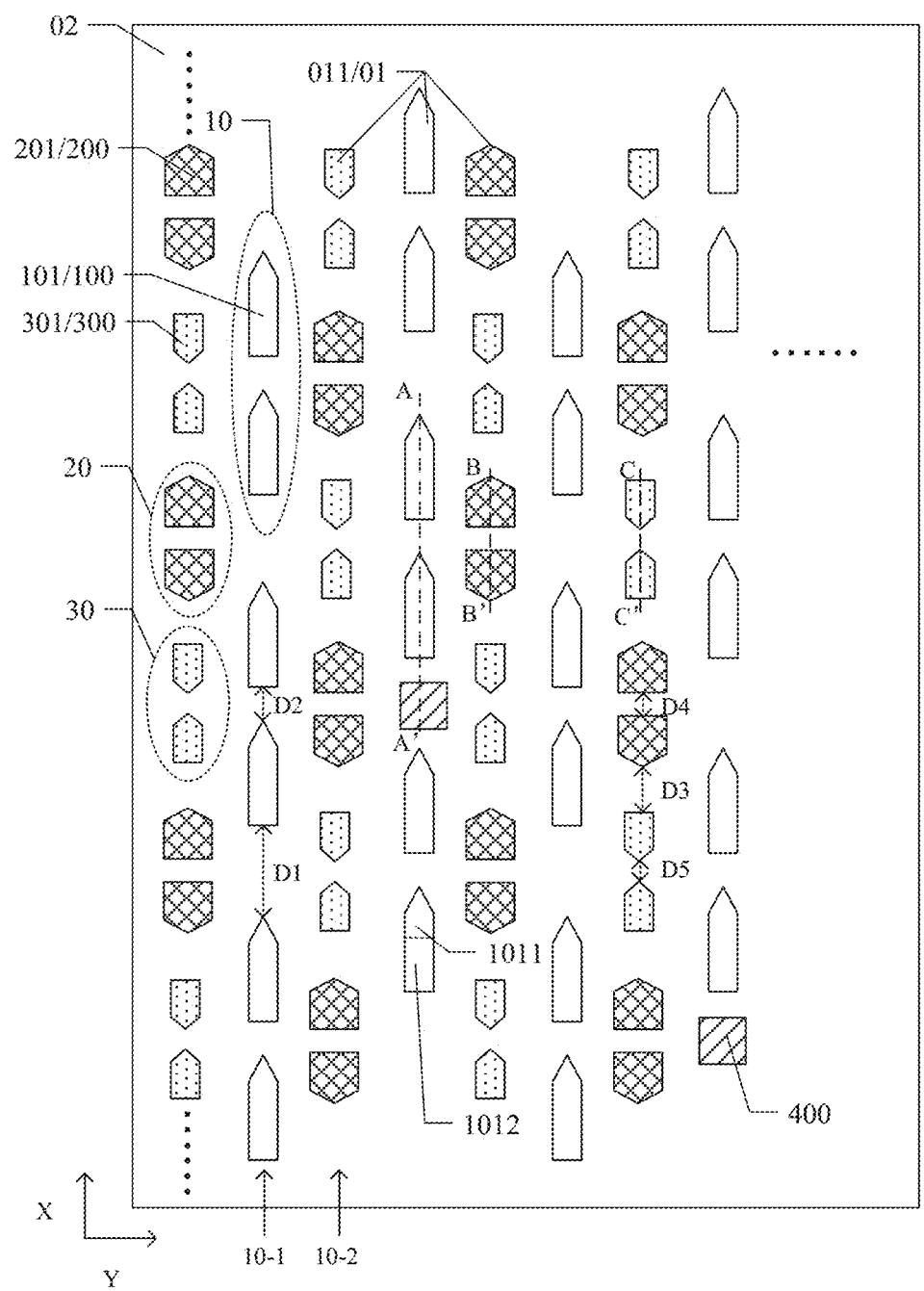
FIG. 3 is a partial planar structural view of a display panel provided by an example of the embodiment of the present disclosure.

FIG. 1 is a planar structural view of a partial pixel arrangement structure of a display panel provided by an embodiment of the present disclosure, and FIG. 2 is a partial cross-sectional structural view taken along line AA' as shown in FIG. 3. As shown in FIG. 1 and FIG. 2, the display panel includes a plurality of sub-pixels 01, each sub-pixel 01 includes a light-emitting region 011, the plurality of sub-pixels 01 include sub-pixels 100 (at least one example of the embodiment of the present disclosure takes the first color sub-pixels 100 as the sub-pixels 100), and the sub-pixel 100 includes a light-emitting layer 110 (at least one example of the embodiment of the present disclosure takes the first light-emitting layer 110 as the light-emitting layer 110) to emit light of one color, such as a first color light. For example, the sub-pixel 100 is a green sub-pixel, and the light of one color is green light. Of course, the embodiment of the present disclosure is not limited thereto, and the sub-pixel 100 can also be a blue sub-pixel or a red sub-pixel. An example of the embodiment of the present disclosure is described by taking that the sub-pixel 100 is a green sub-pixel as an example. In the case where the sub-pixel is a green sub-pixel, the manufacture of the display panel can be facilitated and the process difficulty can be reduced.

As shown in FIG. 1 and FIG. 2, the plurality of sub-pixels 100 include a plurality of sub-pixel pairs 10 (at least one example of the embodiment of the present disclosure takes the first sub-pixel pair 10 as the sub-pixel pair 10), and each sub-pixel pair 10 includes two sub-pixels 100 arranged along a first direction. FIG. 1 illustratively shows that the first direction is the X direction. For example, the first direction can be a column direction or a row direction.

As shown in FIG. 1 and FIG. 2, the light-emitting layers 110 of the two sub-pixels 100 in each sub-pixel pair 10 are integrated, and the light-emitting regions 101 of the two sub-pixels 100 in at least one sub-pixel pair 10 are distributed asymmetrically with respect to any straight line extending along a second direction. For example, the light-emitting regions 101 of two sub-pixels 100 in the sub-pixel pair 10 are distributed asymmetrically with respect to a straight line passing through the center of the sub-pixel pair 10 and extending along the second direction, thereby being beneficial to increase the pixels per inch of the display panel and to adjust the brightness center of a pixel including sub-pixels of different colors to improve the uniformity of color distribution of the display panel. The center of the sub-pixel pair 10 can refer to the midpoint of a connecting line between the centers of the two light-emitting regions of the sub-pixel pair 10.

For example, the light-emitting layers 110 in each sub-pixel pair 10 are configured to be obtained by evaporating luminescent materials from the same evaporation hole in the mask plate (or the same opening of the mask), so that the light-emitting layers 110 in the two sub-pixels 100 of the sub-pixel pair 10 are formed as an integrated structure, which can not only reduce the manufacture difficulty of forming light-emitting layers, but also help to reduce the area of a non-light-emitting region, and further increase the PPI and aperture ratio of the display panel.

For example, the light-emitting layers 110 of two adjacent sub-pixel pairs 10 can be separated from each other, and the light-emitting layers 110 of two adjacent sub-pixel pairs 10 are formed by evaporating luminescent materials from two different evaporation holes in a mask plate.

For example, the light-emitting regions 101 of the two sub-pixels 100 in at least one sub-pixel pair 10 being distributed asymmetrically means that the light-emitting region 101 of one sub-pixel 100 in one sub-pixel pair 10 cannot coincide with the light-emitting region 101 of the other sub-pixel 100 after being folded along a line (such as a straight line extending along the Y direction). For example, the light-emitting regions 101 of the two sub-pixels 100 in each sub-pixel pair 10 are distributed asymmetrically.

For example, as shown in FIG. 1, the light-emitting regions 101 of the two sub-pixels 100 in the sub-pixel pair 10 have the same shape and the same area, and the light-emitting region 101 of one sub-pixel 100 in the two sub-pixels 100 can coincide with the light-emitting region 101 of the other sub-pixel 100 after being translated by a certain distance along the first direction. The term "same" in the embodiment of the present disclosure includes "strictly the same" and "approximate the same", and "approximate the same" means that the ratio of the difference between two items to either of them does not exceed 10%.

For example, the light-emitting regions 101 of the two sub-pixels 100 in the sub-pixel pair 10 have different shapes, and the light-emitting regions 101 of the two sub-pixels 100 are distributed asymmetrically.

For example, as shown in FIG. 1 and FIG. 2, the display panel includes a base substrate 02 and a pixel defining layer 03 disposed on the base substrate 02, the pixel defining layer 03 includes a plurality of openings, and at least some openings of the plurality of openings are configured to define the light-emitting regions 011 of the plurality of sub-pixels 01. For example, each sub-pixel 01 includes an organic light-emitting element; the organic light-emitting element includes a first electrode, a light-emitting layer 012 and a second electrode 013 which are stacked, and the second electrode 013 is located at one side of the light-emitting layer 012 facing the base substrate 02. For example, at least part of the second electrode 013 is located at one side of the pixel defining layer 03 facing the base substrate 02. In the case where the light-emitting layer 012 is formed in the opening of the pixel defining layer 03, the first electrode and the second electrode 013 located at both sides of the light-emitting layer 012 can drive the light-emitting layer 012 in the opening of the pixel defining layer 03 to emit light. For example, a functional layer can be disposed between the light-emitting layer 012 and the first electrode, and/or a functional layer can be disposed between the light-emitting layer 012 and the second electrode 013. For example, the functional layer includes any one or more layers of a hole injection layer, a hole transport layer, an electron transport layer, a hole blocking layer, an electron blocking layer, an electron injection layer, an auxiliary light-emitting layer, an interface improvement layer, an anti-reflective layer, etc.

The light-emitting region can refer to a region where the sub-pixel effectively emits light, and the shape of the light-emitting region refers to a two-dimensional shape. For example, the shape of the light-emitting region can be the same as the shape of the opening of the pixel defining layer.

For example, as shown in FIG. 1, the display panel includes a plurality of pixel groups 10-1 (at least one example of the embodiment of the present disclosure takes the first pixel group 10-1 as the pixel group 10-1), each pixel group 10-1 includes sub-pixel pairs 10 arranged along the first direction, and the plurality of pixel groups 10-1 are arranged along the second direction. For example, each pixel group 10-1 includes a column of sub-pixel pairs 10, and two adjacent pixel groups 10-1 are offset with respect to each other in the first direction. For example, two adjacent pixel groups 10-1 mean that there is no other pixel group 10-1 between the two pixel groups 10-1. For example, two adjacent pixel groups 10-1 being offset with respect to each other in the first direction means that there is a certain shift in the first direction between adjacent pixel groups 10-1. For example, the sub-pixel pairs 10 located in the same row arranged in the second direction are all located in the odd-numbered columns of pixel groups 10-1 or in the even-numbered columns of pixel groups 10-1. Here, the second direction refers to the Y direction in FIG. 1, and the second direction intersects with the first direction. For example, the first direction and the second direction can be perpendicular to each other. For example, one of the first direction and the second direction can be a column direction and the other can be a row direction, and the first direction and the second direction can be interchanged.

For example, as shown in FIG. 1, in at least some sub-pixel pairs 10, the light-emitting regions 101 of the two sub-pixels 100 have the same shape. For example, in each sub-pixel pair 10, the light-emitting regions 101 of the two sub-pixels 100 have the same shape. For example, the light-emitting region 101 of each sub-pixel 100 includes a first sub-region 1011 and a second sub-region 1012 connected with each other. For example, the first sub-region 1011 and the second sub-region 1012 are two partial regions artificially divided in the light-emitting region 101, the first sub-region 1011 and the second sub-region 1012 are two partial regions that are connected with each other, there is no space between these two partial regions, and these two partial regions constitute the light-emitting region 101.

For example, as shown in FIG. 1, in the same light-emitting region 101, the first sub-region 1011 and the second sub-region 1012 are arranged along the first direction, the first sub-region 1011 and the second sub-region 1012 have the same maximum size in the first direction, and the first sub-region 1011 and the second sub-region 1012 have different shapes. For example, in the same light-emitting region 101, the first sub-region 1011 and the second sub-region 1012 are distributed asymmetrically, and the first sub-region 1011 cannot coincide with the second sub-region 1012 after being folded with respect to a straight line extending along the Y direction.

For example, as shown in FIG. 1, in at least some sub-pixel pairs 10, the light-emitting regions 101 of the two sub-pixels 100 have the same arrangement direction of the first sub-region 1011 and the second sub-region 1012. For example, in each sub-pixel pair 10, the light-emitting regions 101 of the two sub-pixels 100 have the same arrangement direction of the first sub-region 1011 and the second sub-region 1012. The arrangement direction of the first sub-region 1011 and the second sub-region 1012 refers to the direction in which the center of the first sub-region 1011 points to the center of the second sub-region 1012. For example, FIG. 1 illustratively shows that the first sub-region 1011 and the second sub-region 1012 are arranged along a direction opposite to the direction indicated by the arrow of the X direction, but not limited thereto, and the first sub-region 1011 and the second sub-region 1012 can also be arranged along the same direction as the direction indicated by the arrow of the X direction.

For example, as shown in FIG. 1, the arrangement directions of the first sub-region 1011 and the second sub-region 1012 in the light-emitting regions 101 of all sub-pixels 100, in two sub-pixel pairs 10 adjacent in the first direction, are the same. For example, the arrangement directions of the first sub-region 1011 and the second sub-region 1012 in the light-emitting regions 101 of the sub-pixels 100 in all sub-pixel pairs 10 are the same. For example, taking the direction indicated by the arrow of the X direction as upward as an example, the first sub-region 1011 is located on the upper side of the second sub-region 1012 in each sub-pixel 100. In the embodiment of the present disclosure, by setting the shapes and arrangement directions of the light-emitting regions of the sub-pixels to be the same, it is convenient to manufacture.

For example, as shown in FIG. 1, in the light-emitting region 101 of the sub-pixel 100, the area of the first sub-region 1011 is smaller than the area of the second sub-region 1012. For example, in the light-emitting region 101 of the sub-pixel 100, the size of the end of the first sub-region 1011 farthest from the second sub-region 1012 in the second direction is less than the size of the end of the second sub-region 1012 farthest from the first sub-region 1011 in the second direction. For example, in the same light-emitting region 101, the size of the region of the first sub-region 1011 away from the second sub-region 1012 in the second direction gradually decreases along the direction indicated by the arrow of the X direction. For example, in the same light-emitting region 101, the size of the second sub-region 1012 in the second direction is basically unchanged along the direction opposite to the direction indicated by the arrow of the X direction.

For example, as shown in FIG. 1, the shape of the light-emitting region 101 can be a pentagon, the shape of the first sub-region 1011 can be a pentagon, the shape of the second sub-region 1012 can be a quadrangle, and the area of the second sub-region 1012 is greater than the area of the first sub-region 1011. For example, the shape of the second sub-region 1012 can include a rectangle. For example, the shape of the light-emitting region 101 can include a pentagon formed by combining a quadrangle and a triangle. Of course, the embodiment of the present disclosure is not limited thereto, and the shape of the light-emitting region 101 can also be a hexagon, a quadrangle (such as a trapezoid), a drop-let shape, etc., and the first sub-region and the second sub-region can also be triangular, quadrilateral (such as trapezoid), hexagonal, etc.

For example, as shown in FIG. 1, the shape of the light-emitting region 101 of each sub-pixel 100 includes a pentagon, an end of the first sub-region 1011 farthest from the second sub-region 1012 includes the vertex of a corner of the pentagon, and an end of the second sub-region 1012 farthest from the first sub-region 1011 includes a side of the pentagon. For example, the end of the second sub-region 1012 farthest from the first sub-region 1011 includes a side parallel to the second direction.

For example, FIG. 1 illustratively shows that the corners of the light-emitting region 101 of the sub-pixel 100 are strictly sharp corners formed by the intersection of two line segments, but it is not limited thereto, and at least some corners of the light-emitting region 101 can also be rounded corners. For example, in the case where the opening of the pixel defining layer is formed, the portion of the opening at a corner may be formed as a rounded corner, so that the shape of the light-emitting region being formed has a rounded corner.

For example, as shown in FIG. 1, the maximum size of the light-emitting region 101 of each sub-pixel 100 in the first direction is a first size, the maximum size of the light-emitting region 101 of each sub-pixel 100 in the second direction is a second size, and the first size is greater than the second size. For example, the shape of the light-emitting region 101 of the sub-pixel 100 can be a strip-shape. In the embodiment of the present disclosure, the size of the light-emitting region 101 of the sub-pixel 100 is set to be greater in the first direction than in the second direction, which can be beneficial to color matching with other color sub-pixels (described later) when emitting light.

For example, FIG. 3 is a partial planar structural view of a display panel provided by an example of the embodiment of the present disclosure. As shown in FIGS. 1-3, the distance between the light-emitting regions 101 of two adjacent sub-pixel pairs 10 arranged along the first direction is a first distance D1, the distance between the light-emitting regions 101 of the two sub-pixels 100 in each sub-pixel pair 10 is a second distance D2, and the first distance D1 is greater than the second distance D2. For example, the distance between the light-emitting regions 101 of the two sub-pixels 100 in each sub-pixel pair 10 is equal. For example, the distance between the light-emitting regions 101 of every two adjacent sub-pixel pairs 10 arranged along the first direction is equal.

In the embodiment of the present disclosure, the distance between two light-emitting regions refers to the shortest distance between the edges of the two light-emitting regions. For example, in the case where two sides of two light-emitting regions are close to each other, the distance between the two light-emitting regions refers to the distance between the two sides; in the case where the two vertices of two light-emitting regions are close to each other, the distance between the two light-emitting regions refers to the distance between the two vertices.

For example, as shown in FIG. 3, the display panel further includes a spacer 400, and the spacer 400 is disposed at a gap between the light-emitting regions 101 of two sub-pixel pairs 10 adjacent in the first direction. For example, the size of the gap between the light-emitting regions 101 of two sub-pixel pairs 10 adjacent in the first direction is set to be large to place the spacer 400.

For example, the display panel includes a plurality of spacers 400, each spacer 400 is disposed at a gap between the light-emitting regions 101 of two adjacent sub-pixel pairs 10, and the plurality of spacers 400 can be evenly distributed. For example, the number of gaps between the light-emitting regions 101 of the sub-pixel pairs 10 can be greater than the number of spacers 400, and some gaps are used to place spacers 400, and one spacer 400 is set at one gap.

For example, the spacer 400 is used to support the evaporation mask plate for manufacturing the light-emitting layer. For example, the size of the interval between evaporation holes for evaporating the light-emitting layers 110 of sub-pixel pairs 10 adjacent in the first direction can be in the range of 10-20 microns, and the interval between the evaporation holes can be set on the spacer 400, so that the spacer 400 supports the mask plate. Setting the spacer 400 between adjacent sub-pixels of the same color (such as green sub-pixels) can reduce the requirement for the alignment accuracy of the evaporation mask plate.

Figure 4:
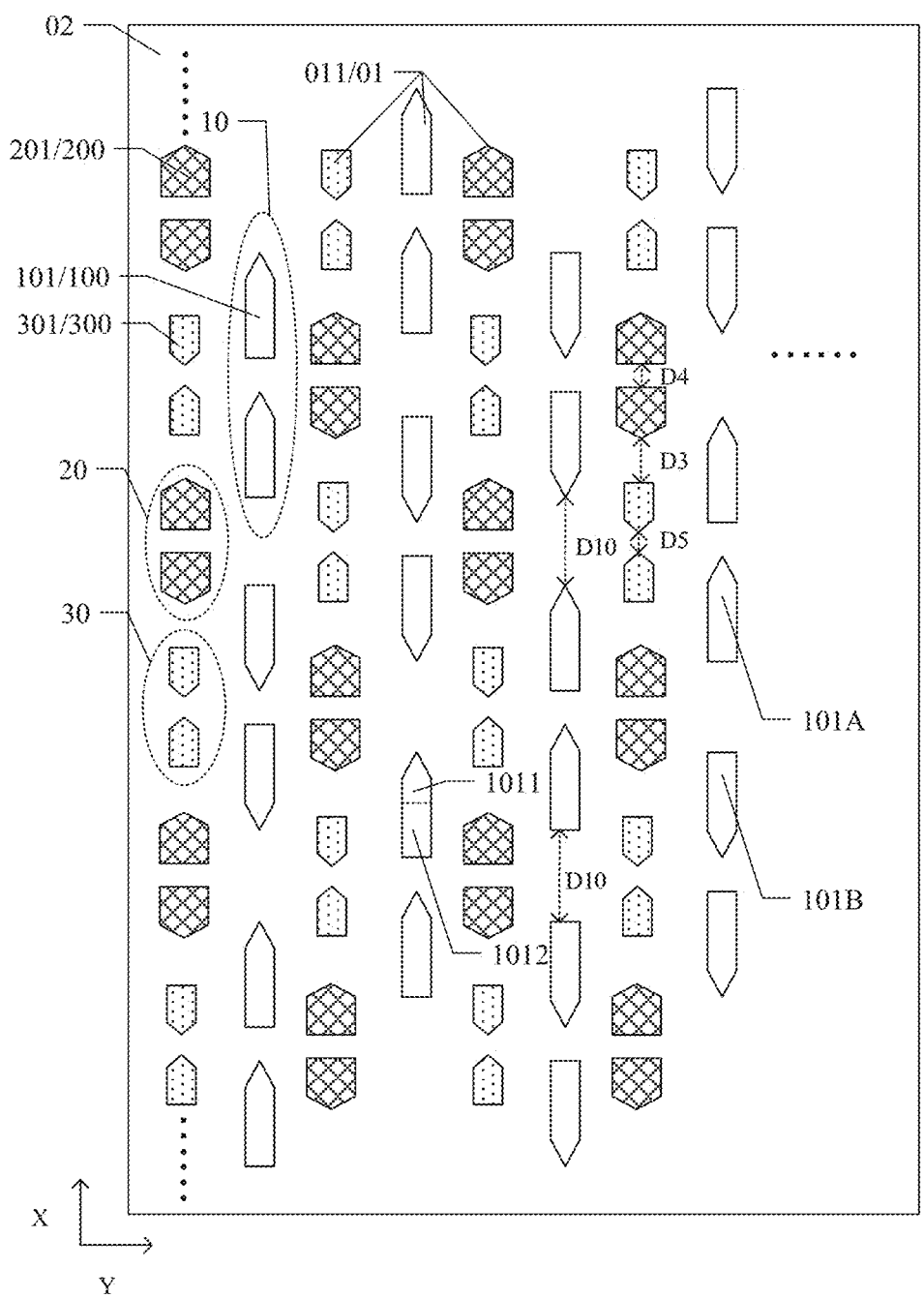
FIG. 4 is a partial planar structural view of a display panel provided by another example of the embodiment of the present disclosure.

For example, FIG. 4 is a partial planar structural view of a display panel provided by another example of the embodiment of the present disclosure. The display panel shown in FIG. 4 is different from the display panel shown in FIG. 1 in the arrangement of the light-emitting regions 101 of the sub-pixels 100 in two sub-pixel pairs 10 adjacent in the first direction. As shown in FIG. 4, in one of two sub-pixel pairs 10 adjacent in the first direction, the arrangement directions of the first sub-region 1011 and the second sub-region 1012 in the light-emitting regions 101 of the two sub-pixels 100 are both first arrangement directions; in the other of the two adjacent sub-pixel pairs 10, the arrangement directions of the first sub-region 1011 and the second sub-region 1012 in the light-emitting regions 101 of the two sub-pixels 100 are both second arrangement directions, and the included angle between the first arrangement direction and the second arrangement direction is greater than 120 degrees. The above and subsequent arrangement directions all refer to the direction in which the center of the first sub-region points to the center of the second sub-region. For example, the included angle between the first arrangement direction and the second arrangement direction is greater than 150 degrees. For example, the first arrangement direction is opposite to the second arrangement direction.

For example, as shown in FIG. 4, in one of two sub-pixel pairs 10 adjacent in the first direction, the directions in which the center of the first sub-region 1011 points to the center of the second sub-region 1012 in the light-emitting regions 101 of the two sub-pixels 100 are both the first arrangement directions; in the other of the two adjacent sub-pixel pairs 10, the directions in which the center of the first sub-region 1011 points to the center of the second sub-region 1012 in the light-emitting regions 101 of the two sub-pixels 100 are both the second arrangement directions, and the first arrangement direction is opposite to the second arrangement direction.

For example, as shown in FIG. 4, the light-emitting region 101 with the first arrangement direction can be a light-emitting region 101A, and the light-emitting region 101 with the second arrangement direction can be a light-emitting region 101B; in odd-numbered columns of light-emitting regions 101, the light-emitting regions 101A and the light-emitting regions 101B are alternately arranged along the second direction; and in even-numbered columns of light-emitting regions 101, the light-emitting regions 101A and the light-emitting regions 101B are alternately arranged along the second direction.

For example, as shown in FIG. 4, the distance between any light-emitting region 101A and any light-emitting region 101B adjacent to each other in the first direction can be equal. For example, in the light-emitting region 101A and the light-emitting region 101B adjacent in the first direction, the first sub-region 1011 in the light-emitting region 101A and the first sub-region 1011 in the light-emitting region 101B are close to each other, and the distance therebetween is D10; in the light-emitting region 101A and the light-emitting region 101B adjacent in the first direction, the second sub-region 1012 in the light-emitting region 101A and the second sub-region 1012 in the light-emitting region 101B are close to each other, and the distance therebetween is also D10.

Figure 5:
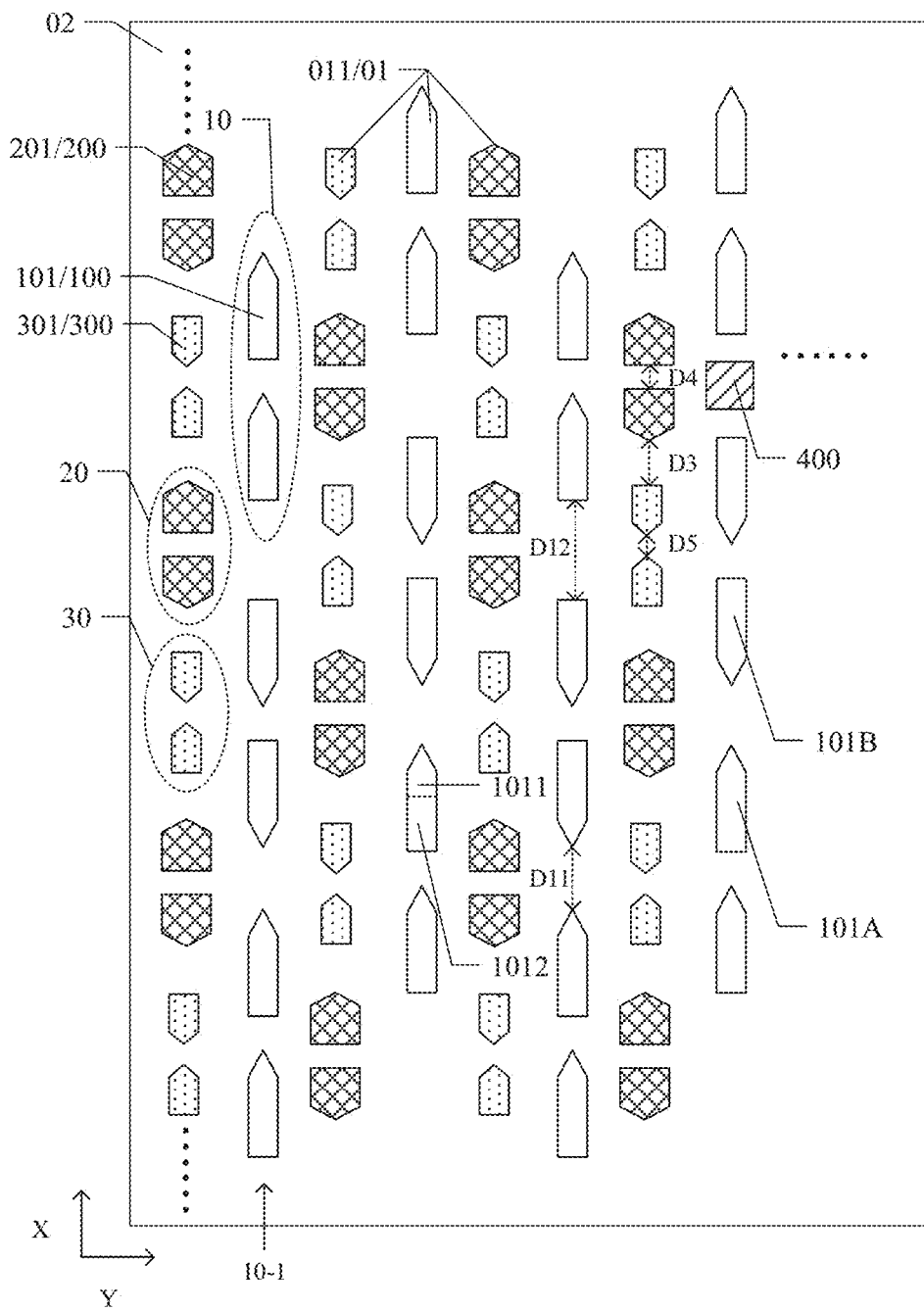
FIG. 5 is a partial planar structural view of a display panel provided by further another example of the embodiment of the present disclosure.

For example, FIG. 5 is a partial planar structural view of a display panel provided by further another example of the embodiment of the present disclosure. The display panel shown in FIG. 5 is different from the display panel shown in FIG. 4 in the arrangement of the light-emitting regions 101 of the sub-pixels 100 in two sub-pixel pairs 10 adjacent in the first direction. As shown in FIG. 5, the display panel includes a plurality of pixel groups 10-1, and each pixel group 10-1 includes sub-pixel pairs 10 arranged along the first direction; in at least some sub-pixel pairs 10, the light-emitting regions 101 of the two sub-pixels 100 have the same shape, the light-emitting region 101 of each sub-pixel 100 includes a first sub-region 1011 and a second sub-region 1012 connected with each other, the first sub-region 1011 and the second sub-region 1012 are arranged along the first direction, the first sub-region 1011 and the second sub-region 1012 have the same maximum size in the first direction, and the area of the first sub-region 1011 is smaller than the area of the second sub-region 1012. In one of two sub-pixel pairs 10 adjacent in the first direction, the arrangement directions of the first sub-region 1011 and the second sub-region 1012 in the light-emitting regions 101 of the two sub-pixels 100 are both first arrangement directions; in the other of the two adjacent sub-pixel pairs 10, the arrangement directions of the first sub-region 1011 and the second sub-region 1012 in the light-emitting regions 101 of the two sub-pixels 100 are both second arrangement directions, and the included angle between the first arrangement direction and the second arrangement direction is greater than 120 degrees. In at least one first pixel group 10-1, in the case where two sub-regions close to each other in two adjacent sub-pixel pairs 10 are two first sub-regions 1011, the distance between the two first sub-regions 1011 close to each other is a first sub-distance D11, and in the case where two sub-regions close to each other in two adjacent sub-pixel pairs 10 are two second sub-regions 1012, the distance between the two second sub-regions 1012 close to each other is a second sub-distance D12, and the first sub-distance D11 is less than the second sub-distance D12. In the present example, in the case where the area of the first sub-region is smaller than the area of the second sub-region and the arrangement directions of the first sub-region and the second sub-region in adjacent first sub-pixel pairs arranged in the first direction are opposite to each other, by adjusting the distance between two first sub-regions close to each other to be less than the distance between two second sub-regions close to each other, it is beneficial to adjust the brightness distribution after the first color sub-pixel emits light and to improve the brightness uniformity of the first color sub-pixels.

For example, the included angle between the first arrangement direction and the second arrangement direction is greater than 150 degrees. For example, the first arrangement direction and the second arrangement direction are opposite to each other.

For example, as shown in FIG. 5, the light-emitting region 101 with the first arrangement direction can be a light-emitting region 101A, and the light-emitting region 101 with the second arrangement direction can be a light-emitting region 101B; in odd-numbered columns of light-emitting regions 101, the light-emitting regions 101 arranged along the second direction are all light-emitting regions 101A or light-emitting regions 101B; and in even-numbered columns of light-emitting regions 101, the light-emitting regions 101 arranged along the second direction are all light-emitting regions 101B or light-emitting regions 101A.

For example, as shown in FIG. 5, the display panel further includes a spacer 400, and the spacer 400 is disposed at a gap between the two second sub-regions 1012 close to each other in two adjacent sub-pixel pairs 10. In the embodiment of the present disclosure, the size of the gap between the two second sub-regions close to each other is set to be large enough to place the spacer.

For example, as shown in FIGS. 1-5, the plurality of sub-pixels 01 further include sub-pixels 200 (at least one example of the embodiment of the present disclosure takes the second color sub-pixels 200 as the sub-pixels 200) and sub-pixels 300 (at least one example of the embodiment of the present disclosure takes the third color sub-pixels 300 as the sub-pixels 300). The display panel further includes a plurality of pixel groups 10-2 (at least one example of the embodiment of the present disclosure takes the second pixel groups 10-2 as the pixel groups 10-2), each pixel group 10-2 includes sub-pixels 200 and sub-pixels 300 arranged along the first direction, the plurality of pixel groups 10-1 and the plurality of sub-pixel groups 10-2 are alternately arranged along the second direction, and two adjacent sub-pixel groups 10-2 are offset with respect to each other in the first direction. Here, two adjacent sub-pixel groups 10-2 mean that there is no other sub-pixel group 10-2 between the two sub-pixel groups 10-2, but there may be a sub-pixel group 10-1 between the two sub-pixel groups 10-2. Similarly, two adjacent sub-pixel groups 10-1 mean that there is no other sub-pixel group 10-1 between the two sub-pixel groups 10-1, but there may be a sub-pixel group 10-2 between the two sub-pixel groups 10-1.

Figure 6:
FIG. 6 is a partial cross-sectional structural view taken along line BB' as shown in FIG. 3.
Figure 7:
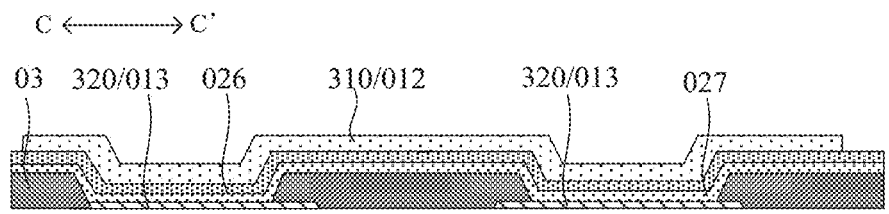
FIG. 7 is a partial cross-sectional structural view taken along line CC' as shown in FIG. 3.

FIG. 6 is a partial cross-sectional structural view taken along line BB' as shown in FIG. 3, and FIG. 7 is a partial cross-sectional structural view taken along line CC' as shown in FIG. 3. For example, as shown in FIGS. 1-7, the sub-pixel 200 includes a second light-emitting layer 210 to emit a second color light, and the sub-pixel 300 includes a third light-emitting layer 310 to emit a third color light. For example, one of the sub-pixel 200 and the sub-pixel 300 is a red sub-pixel, and the other of the sub-pixel 200 and the sub-pixel 300 is a blue sub-pixel. For example, FIGS. 1-5 illustratively show that the sub-pixel 200 is a blue sub-pixel and the sub-pixel 300 is a red sub-pixel, and the area of the light-emitting region of the blue sub-pixel is greater than the area of the light-emitting region of the red sub-pixel.

For example, as shown in FIGS. 1-7, the area of the light-emitting region 101 of the sub-pixel 100 is greater than the area of the light-emitting region 201 of the sub-pixel 200, and the area of the light-emitting region 101 of the sub-pixel 100 is greater than the area of the light-emitting region 301 of the sub-pixel 300. The embodiment of the present disclosure is not limited thereto, and the area of the light-emitting region 201 of the sub-pixel 200 can be greater than the area of the light-emitting region 101 of the sub-pixel 100.

For example, as shown in FIG. 1, one sub-pixel 100, one sub-pixel 200 and one sub-pixel 300 form one pixel P. For example, the three sub-pixels in the pixel P are arranged in a triangle. For example, one pixel P includes two columns (or two rows) of sub-pixels, one column (or one row) of sub-pixels includes the sub-pixel 100, and the other column (or the other row) of sub-pixels includes the sub-pixel 200 and the sub-pixel 300. For example, in one pixel P of two adjacent pixels P arranged along the first direction, the arrangement direction of the sub-pixel 200 and the sub-pixel 300 is the first arrangement direction, and in the other pixel P of the two adjacent pixels P arranged along the first direction, the arrangement direction of the sub-pixel 200 and the sub-pixel 300 is the second arrangement direction.

For example, as shown in FIG. 1, FIG. 6 and FIG. 7, the plurality of sub-pixels 200 include a plurality of sub-pixel pairs 20 (at least one example of the embodiment of the present disclosure takes the second sub-pixel pair 20 as the pixel pair 20), each sub-pixel pair 20 includes two sub-pixels 200 arranged along the first direction, and the light-emitting layers 210 of the two sub-pixels 200 in each sub-pixel pair 20 (at least one example of the embodiment of the present disclosure takes the second light-emitting layer 210 as the light-emitting layer 210) are integrated. For example, the light-emitting layers 210 in each sub-pixel pair 20 are configured to be obtained by evaporating luminescent materials from the same evaporation hole in the mask plate (or the same opening of the mask), so that the light-emitting layers 210 in the two sub-pixels 200 of the sub-pixel pair 20 are formed as an integrated structure, which can not only reduce the manufacture difficulty of forming light-emitting layers, but also help to reduce the area of a non-light-emitting region, and further increase the PPI and aperture ratio of the display panel. For example, the light-emitting layers 210 of two adjacent sub-pixel pairs 20 can be separated from each other, and the light-emitting layers 210 of two adjacent sub-pixel pairs 20 are formed by evaporating luminescent materials from different evaporation holes in the same mask plate. Here, two adjacent sub-pixel pairs 20 mean that there is no other sub-pixel pair 20 between the two sub-pixel pairs 20, but there may be a sub-pixel pair 30 or a sub-pixel pair 10 therebetween.

For example, as shown in FIG. 1, FIG. 6 and FIG. 7, the plurality of sub-pixels 300 include a plurality of sub-pixel pairs 30 (at least one example of the embodiment of the present disclosure takes the third sub-pixel pair 30 as the pixel pair 30), each sub-pixel pair 30 includes two sub-pixels 300 arranged along the first direction, and the light-emitting layers 310 of the two sub-pixels 300 in each sub-pixel pair 30 (at least one example of the embodiment of the present disclosure takes the third light-emitting layer 310 as the light-emitting layer 310) are integrated. For example, the light-emitting layers 310 in each sub-pixel pair 30 are configured to be obtained by evaporating luminescent materials from the same evaporation hole in the mask plate (or the same opening of the mask), so that the light-emitting layers 310 in the two sub-pixels 300 of the sub-pixel pair 30 are formed as an integrated structure, which can not only reduce the manufacture difficulty of forming light-emitting layers, but also help to reduce the area of a non-light-emitting region, and further increase the PPI and aperture ratio of the display panel. For example, the light-emitting layers 310 of two adjacent sub-pixel pairs 30 can be separated from each other, and the light-emitting layers 310 of two adjacent sub-pixel pairs 30 are formed by evaporating luminescent materials from different evaporation holes in the same mask plate. Here, two adjacent sub-pixel pairs 30 mean that there is no other sub-pixel pair 30 between the two sub-pixel pairs 30, but there may be a sub-pixel pair 20 or a sub-pixel pair 10 therebetween.

For example, as shown in FIGS. 1-7, in the case where the light-emitting layer of each sub-pixel is evaporated by using a evaporation mask plate, the distance between adjacent sub-pixels with different colors evaporated by different evaporation holes is D' (for example, D' can include D1 and D3), and the distance between the boundaries of evaporation holes for evaporating the light-emitting layers of adjacent sub-pixels with different colors is not greater than D'/2.

For example, as shown in FIG. 1, in each sub-pixel group 10-2, the sub-pixel pairs 20 and the sub-pixel pairs 30 are alternately arranged along the first direction. For example, the sub-pixel pairs 20 and the sub-pixel pairs 30 are alternately arranged along the second direction.

For example, in the sub-pixel pair 20 and the sub-pixel pair 30 which are arranged along the first direction and adjacent to each other, the light-emitting layers of the sub-pixel 200 and the sub-pixel 300 which are close to each other can overlap with each other or be separated from each other.

For example, as shown in FIGS. 1-7, in at least one example of the present disclosure, in the first direction, the distance between the light-emitting regions 011 of the sub-pixel pair 20 and the sub-pixel pair 30 adjacent to each other is a third distance D3, the distance between the light-emitting regions 201 of the two sub-pixels 200 in each sub-pixel pair 20 is a fourth distance D4, the distance between the light-emitting regions 301 of the two sub-pixels 300 in each sub-pixel pair 30 is a fifth distance D5, and both the fourth distance D4 and the fifth distance D5 are less than the third distance D3.

For example, in the first direction, the distance between the two sub-pixels in each sub-pixel pair is less than the distance between two adjacent sub-pixel pairs.

For example, as shown in FIGS. 1-7, in at least one example of the present disclosure, the third distance D3 is less than the first distance D1.

For example, as shown in FIGS. 1-7, a straight line extending along the second direction passes through the light-emitting region 101 of the sub-pixel 100, the light-emitting region 201 of the sub-pixel 200 and the light-emitting region 301 of the sub-pixel 300.

For example, as shown in FIG. 1, the pixel group 10-1 and the pixel group 10-2 which are adjacent to each other are shifted in the first direction, and a straight line L1 extending along the second direction passes through the light-emitting region 101 of the sub-pixel 100 and the gap between the light-emitting region 301 of the sub-pixel 300 and the light-emitting region 201 of the sub-pixel 200 arranged along the first direction and adjacent to each other.

For example, as shown in FIGS. 1-7, the light-emitting region 201 of the sub-pixel pair 20 corresponds to the light-emitting region 101 of the sub-pixel pair 10 located at one side thereof in the second direction, and corresponds to the gap between the light-emitting regions 101 of two adjacent sub-pixel pairs 10 located at the other side thereof in the second direction. For example, the light-emitting region 301 of the sub-pixel pair 30 corresponds to the light-emitting region 101 of the sub-pixel pair 10 located at one side thereof in the second direction, and corresponds to the gap between the light-emitting regions 101 of two adjacent sub-pixel pairs 10 located at the other side thereof in the second direction.

For example, as shown in FIGS. 1-7, in the first direction, the sizes of the light-emitting regions of the sub-pixel 200 and the sub-pixel 300 are both less than the size of the light-emitting region of the sub-pixel 100.

For example, as shown in FIGS. 1-7, in the second direction, the sizes of the light-emitting regions of the sub-pixel 100 and the sub-pixel 300 are both less than the size of the light-emitting region of the sub-pixel 200.

For example, as shown in FIGS. 1-7, in each sub-pixel pair 20, the light-emitting regions 201 of the two sub-pixels 200 are symmetrically distributed with respect to a first symmetry axis C1 extending along the second direction. For example, in at least some sub-pixel pairs 20, the light-emitting regions 201 of the two sub-pixels 200 have the same shape and the same area. For example, in each sub-pixel pair 20, the light-emitting regions 201 of the two sub-pixels 200 have the same shape and the same area. Of course, the embodiment of the present disclosure is not limited thereto, and the light-emitting regions 201 of the two sub-pixels 200 in the same sub-pixel pair 20 can have different shapes.

For example, as shown in FIGS. 1-7, in each sub-pixel pair 30, the light-emitting regions 301 of the two sub-pixels 300 are symmetrically distributed with respect to a second symmetry axis C2 extending along the second direction. For example, in at least some sub-pixel pairs 30, the light-emitting regions 301 of the two sub-pixels 300 have the same shape and the same area. For example, in each sub-pixel pair 30, the light-emitting regions 301 of the two sub-pixels 300 have the same shape and the same area. Of course, the embodiment of the present disclosure is not limited thereto, and the light-emitting regions 301 of the two sub-pixels 300 in the same sub-pixel pair 30 can have different shapes.

For example, as shown in FIGS. 1-7, the shapes of the light-emitting regions of the sub-pixel 200 and the sub-pixel 300 are both pentagons. The embodiment of the present disclosure is not limited thereto, and the shape of at least one of the sub-pixel 200 and the sub-pixel 300 can also be a regular shape, such as a quadrangle, a hexagon, an ellipse, a diamond or a shuttle, etc.

For example, as shown in FIGS. 1-7, in the sub-pixel pair 20, the light-emitting regions 201 of the two sub-pixels 200 have two corners opposite to each other; in the sub-pixel pair 30, the light-emitting regions 301 of the two sub-pixels 300 have two edges opposite to each other; and an edge of one of the light-emitting region 201 of the sub-pixel 200 and the light-emitting region 301 of the sub-pixel 300 adjacent to each other in the first direction is opposite to a corner of the other of the light-emitting region 201 of the sub-pixel 200 and the light-emitting region 301 of the sub-pixel 300 adjacent to each other in the first direction.

The embodiment of the present disclosure is not limited thereto. For example, the shapes of the sub-pixels in the sub-pixel pair 20 and the sub-pixel pair 30 can all be pentagons, the light-emitting regions 201 of the two sub-pixels 200 in the sub-pixel pair 20 have two corners opposite to each other, the light-emitting regions 301 of the two sub-pixels 300 in the sub-pixel pair 30 have two corners opposite to each other, and the light-emitting regions in the sub-pixel 200 and the sub-pixel 300 that are adjacent to each other have two edges opposite to each other.

The embodiment of the present disclosure is not limited thereto. For example, the shapes of the sub-pixels in the sub-pixel pair 20 and the sub-pixel pair 30 can all be pentagons, the light-emitting regions 201 of the two sub-pixels 200 in the sub-pixel pair 20 have two edges opposite to each other, the light-emitting regions 301 of the two sub-pixels 300 in the sub-pixel pair 30 have two edges opposite to each other, and the light-emitting regions in the sub-pixel 200 and the sub-pixel 300 that are adjacent to each other have two corners opposite to each other.

For example, as shown in FIGS. 1-7, in each sub-pixel group 10-2, the geometric center of the light-emitting region 201 of the sub-pixel 200 and the geometric center of the light-emitting region 301 of the sub-pixel 300 can be basically located on a straight line extending along the first direction. For example, in each sub-pixel group 10-1, the geometric center of the light-emitting region 101 of each sub-pixel 100 can be basically located on a straight line extending along the first direction.

Figure 8:
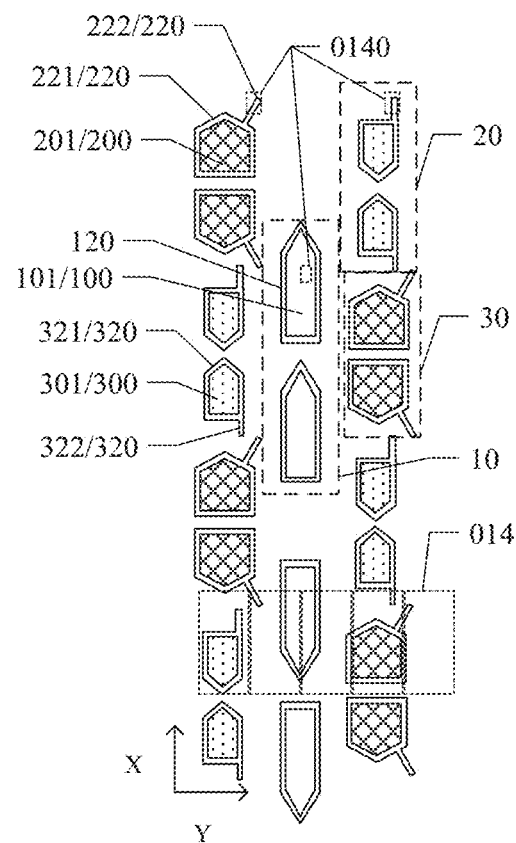
FIG. 8 is a schematic diagram of positional relationship between the light-emitting region and the electrode in each sub-pixel according to the embodiment of the present disclosure.

For example, FIG. 8 is a schematic diagram of positional relationship between the light-emitting region and the electrode in each sub-pixel according to the embodiment of the present disclosure. FIG. 8 illustratively shows the positional relationship between the light-emitting region and the electrode in each sub-pixel in the example shown in FIG. 4 or FIG. 5. However, it is not limited thereto, and the positional relationship between the light-emitting region and the electrode in each sub-pixel in the examples shown in FIG. 1 and FIG. 3 is the same as that shown in FIG. 8, which is not repeated here.

For example, as shown in FIGS. 2-8, each sub-pixel 01 includes an electrode 013 located at one side of the light-emitting layer 012 facing the base substrate 02, and a pixel circuit 014 connected with the electrode 013; an insulating layer 025 is disposed between the pixel circuit 014 and the electrode 013, and the electrode 013 is electrically connected with the pixel circuit 014 through a via hole 0250 located in the insulating layer 025.

For example, FIG. 2 illustratively shows that the pixel circuit 014 is disposed on the base substrate 02, but it is not limited thereto, and an insulating layer can be disposed between the pixel circuit 014 and the base substrate 02.

For example, as shown in FIG. 2, the pixel circuit 014 can include a thin film transistor 0140; the thin film transistor 0140 includes an active layer, a gate electrode, a source electrode and a drain electrode; the source electrode and the drain electrode of the thin film transistor 0140 can be connected with the source-drain doped regions in the active layer, the gate electrode is located at one side of the active layer away from the base substrate 02, and an insulating layer 022 can be disposed between the active layer and the gate electrode. An insulating layer 023 and an insulating layer 024 can further be provided between the gate electrode and the insulating layer 025. For example, one of the source electrode and the drain electrode of the thin film transistor 0140 can be electrically connected with the electrode 013. For example, the sub-pixel can include a first electrode and a second electrode 013 which are located at both sides of the light-emitting layer 012. FIG. 2 only illustratively shows the electrode 013 located at one side of the light-emitting layer 012 facing the base substrate 02, and does not show the other electrode located at one side of the light-emitting layer 012 away from the base substrate 02. For example, the electrode 013 can be an anode. For example, in each sub-pixel 01, the boundary of the electrode 013 extends outward by 2-4 microns relative to the boundary of the light-emitting region 011. For example, the orthographic projection of the light-emitting region 011 on the base substrate 02 is located within the orthographic projection of the electrode 013 on the base substrate 02, and the portion of the orthographic projection of the electrode 013 that is not covered by the orthographic projection of the light-emitting region 011 includes a ring region, and the ring width of the ring region can be in the range of 2-4 microns.

For example, the pixel circuit 014 can have a 7T1C structure, that is, it includes seven transistors and one capacitor. However, it is not limited thereto, and the pixel circuit 014 can also have other structures, for example, a structure including other numbers of transistors, such as a 7T2C structure, a 6T1C structure, a 6T2C structure or a 9T2C structure, without being limited in the embodiment of the present disclosure.

For example, the pixel circuit 014 can include a driving transistor, a data writing transistor, a storage capacitor, a threshold compensation transistor, a first reset transistor, a second reset transistor, a first light-emitting control transistor, and a second light-emitting control transistor. The pixel circuit can be connected with a gate signal terminal, a data signal terminal, a reset signal terminal, a light-emitting control signal terminal, a power terminal, an initial power terminal, and the electrode 013. The pixel circuit can be configured to drive the light-emitting layer of the sub-pixel to emit light in response to the signals provided by the connected signal terminals.

For example, the thin film transistor 0140 can be the second light-emitting control transistor. For example, one of the source electrode and the drain electrode of the second light-emitting control transistor can be electrically connected with the electrode 013.

For example, as shown in FIG. 2 and FIGS. 6-8, in the sub-pixel 100, a portion of the electrode 120 overlapping with the light-emitting layer 110 is electrically connected with the pixel circuit 014 through the via hole 0250; in the sub-pixel 200, a portion of the electrode 220 not overlapping with the light-emitting layer 210 is electrically connected with the pixel circuit 014 through the via hole; in the sub-pixel 300, a portion of the electrode 320 not overlapping with the light-emitting layer 310 is electrically connected with the pixel circuit 014 through the via hole.

For example, as shown in FIG. 8, in the sub-pixel 100, the portion of the electrode 120 overlapping with the light-emitting layer 110 is electrically connected with the thin film transistor 0140 in the pixel circuit 014 through the via hole; in the sub-pixel 200, the portion of the electrode 220 not overlapping with the light-emitting layer 210 is electrically connected with the thin film transistor 0140 in the pixel circuit 014 through the via hole; in the sub-pixel 300, the portion of the electrode 320 not overlapping with the light-emitting layer 310 is electrically connected with the thin film transistor 0140 in the pixel circuit 014 through the via hole.

For example, as shown in FIG. 8, in the sub-pixel 200 and the sub-pixel 300, the electrode 013 includes a main portion and a connection portion which are connected with each other, and the main portion overlaps with the light-emitting layer 012, and the connection portion is electrically connected with the pixel circuit 014. For example, in the sub-pixel 200 and the sub-pixel 300, the shape of the main portion of the electrode 013 is approximately the same as the shape of the light-emitting region 011. For example, the light-emitting region 011 has a pentagonal shape, and the main portion of the electrode 013 has a pentagonal shape. For example, in the sub-pixel 200 and the sub-pixel 300, the boundary of the main portion of the electrode 013 extends outward by 2-4 microns relative to the boundary of the light-emitting region 011.

For example, as shown in FIG. 8, in the sub-pixel 200, the electrode 220 includes a main portion 221 and a connection portion 222 which are connected with each other, and the main portion 221 overlaps with the light-emitting layer 210, and the connection portion 222 is electrically connected with the pixel circuit 014. For example, in the sub-pixel 200, the shape of the main portion 221 of the electrode 220 is approximately the same as the shape of the light-emitting region 201. For example, the light-emitting region 201 has a pentagonal shape, and the main portion 221 of the electrode 220 has a pentagonal shape. For example, in the sub-pixel 200, the boundary of the main portion 221 of the electrode 220 extends outward by 2-4 microns relative to the boundary of the light-emitting region 201. For example, in the sub-pixel 200, in the direction perpendicular to the base substrate 02, the connection portion 222 does not overlap with the light-emitting region 201. For example, the connection portion 222 extends outward relative to the main portion 221 to be electrically connected with the thin film transistor 0140 of the pixel circuit 014.

For example, as shown in FIG. 8, in the sub-pixel 300, the electrode 320 includes a main portion 321 and a connection portion 322 which are connected with each other, and the main portion 321 overlaps with the light-emitting layer 310, and the connection portion 322 is electrically connected with the pixel circuit 014. For example, in the sub-pixel 300, the shape of the main portion 321 of the electrode 320 is approximately the same as the shape of the light-emitting region 301. For example, the light-emitting region 301 has a pentagonal shape, and the main portion 321 of the electrode 320 has a pentagonal shape. For example, in the sub-pixel 300, the boundary of the main portion 321 of the electrode 320 extends outward by 2-4 microns relative to the boundary of the light-emitting region 301. For example, in the sub-pixel 300, in the direction perpendicular to the base substrate 02, the connection portion 322 does not overlap with the light-emitting region 301. For example, the connection portion 322 extends outward relative to the main portion 321 to be electrically connected with the thin film transistor 0140 of the pixel circuit 014.

For example, as shown in FIG. 8, in the sub-pixel pair 20, the connection portion 222 is located at one side of the main portion 221 connected thereto away from the center of the sub-pixel pair 20. For example, the center of the sub-pixel pair 20 can refer to the midpoint of a line connecting the centers of two light-emitting regions of the sub-pixel pair 20. For example, in the sub-pixel pair 20, two main portions 221 are located between two connection portions 222. For example, the connection portion 222 in the sub-pixel 200 is located at one side of the main portion 221 close to the sub-pixel 300 adjacent to the sub-pixel 200.

For example, the direction indicated by the arrow of the X direction is upward, and the direction indicated by the arrow of the Y direction is rightward. The connection portion 222 of the upper sub-pixel 200 in the sub-pixel pair 20 extends to the upper right, and the connection portion 222 of the lower sub-pixel 200 in the sub-pixel pair 20 extends to the lower right. Of course, the embodiment of the present disclosure is not limited thereto. For example, the connection portion 222 of the upper sub-pixel 200 in the sub-pixel pair 20 extends to the upper left, and the connection portion 222 of the lower sub-pixel 200 in the sub-pixel pair 20 extends to the lower left. For example, the two connection portions 222 in the sub-pixel pair 20 both extend to the right or both extend to the left. The position of the connection portion can be determined according to the position of the thin film transistor electrically connected with the connection portion in the pixel circuit, without being limited in the embodiment of the present disclosure.

For example, as shown in FIG. 8, in the sub-pixel pair 30, the connection portion 322 is located at one side of the main portion 321 connected thereto away from the center of the sub-pixel pair 30. For example, the center of the sub-pixel pair 30 can refer to the midpoint of a line connecting the centers of two light-emitting regions of the sub-pixel pair 30. For example, in the sub-pixel pair 30, two main portions 321 are located between two connection portions 322. For example, the connection portion 322 in the sub-pixel 300 is located at one side of the main portion 321 close to the sub-pixel 200 adjacent to the sub-pixel 300.

For example, the direction indicated by the arrow of the X direction is upward, and the direction indicated by the arrow of the Y direction is rightward. The connection portion 322 of the upper sub-pixel 300 in the sub-pixel pair 30 extends upward, and the connection portion 322 of the lower sub-pixel 300 in the sub-pixel pair 30 extends downward. The position of the connection portion can be determined according to the position of the thin film transistor electrically connected with the connection portion in the pixel circuit, without being limited in the embodiment of the present disclosure.

For example, as shown in FIG. 8, the electrode 120 of the sub-pixel 100 has only a main portion without a connection portion, and the main portion is electrically connected with the pixel circuit 014. For example, the shape of the electrode 120 of the sub-pixel 100 is the same as the shape of the light-emitting region.

For example, the plurality of blocks arranged along the Y direction as shown in FIG. 8 represent a plurality of pixel circuits 014. For example, as shown in FIG. 8, the pixel circuits 014 arranged along the second direction are electrically connected with the connection portion 322 of the sub-pixel 300, the connection portion 222 of the sub-pixel 200 and the electrode 120 of the sub-pixel 100 in sequence; alternatively, the pixel circuits 014 arranged along the second direction are electrically connected with the connection portion 222 of the sub-pixel 200, the connection portion 322 of the sub-pixel 300 and the electrode 120 of the sub-pixel 100 in sequence.

For example, as shown in FIG. 8, a row of pixel circuits arranged along the Y direction are sequentially connected with the electrodes 013 of a sub-pixel 300, a sub-pixel 200, a sub-pixel 100, another sub-pixel 300, another sub-pixel 200, another sub-pixel 100, etc. For example, as shown in FIG. 8, a row of pixel circuits arranged along the Y direction are sequentially connected with the electrodes 013 of a red sub-pixel 300, a blue sub-pixel 200, a green sub-pixel 100, another red sub-pixel 300, another blue sub-pixel 200, another green sub-pixel 100, etc. For example, as shown in FIG. 1 and FIG. 8, in the pixel P including one sub-pixel 100, one sub-pixel 200 and one sub-pixel 300, the three pixel circuits arranged along the Y direction are the pixel circuit of the sub-pixel 300, the pixel circuit of the sub-pixel 200 and the pixel circuit of the sub-pixel 100 in sequence.

An embodiment of the present disclosure provides a display device, which includes any one of the display panels described above.

For example, the display device further includes a cover plate located at the light-exiting side of the display panel.

For example, the display device can be a display such as an organic light-emitting diode display device or the like, or any product or component with display function and including the display, such as a TV, a digital camera, a mobile phone, a watch, a tablet computer, a notebook computer, a navigator, etc., without being limited in the present embodiment.

The following statements should be noted:
(1) The accompanying drawings involve only the structure(s) in connection with the embodiment(s) of the present disclosure, and other structure(s) can be referred to common design(s).
(2) In case of no conflict, features in one embodiment or in different embodiments can be combined.

What have been described above are only specific implementations of the present disclosure, the protection scope of the present disclosure is not limited thereto. The protection scope of the present disclosure should be based on the protection scope of the claims.

The invention claimed is:

1. A display panel, comprising:
a plurality of sub-pixels, each of the plurality of sub-pixels comprising a light-emitting region, the plurality of sub-pixels comprising a plurality of first color sub-pixels, the first color sub-pixel comprising a first light-emitting layer to emit a first color light,
wherein the plurality of first color sub-pixels comprise a plurality of first sub-pixel pairs, each of the plurality of first sub-pixel pairs comprises two first color sub-pixels arranged along a first direction, first light-emitting layers of the two first color sub-pixels in each first sub-pixel pair are integrated, the light-emitting regions of the two first color sub-pixels in at least one first sub-pixel pair are distributed asymmetrically with respect to a straight line passing through a center of the first sub-pixel pair and extending along a second direction, the center of the first sub-pixel pair is a midpoint of a connecting line between centers of the light-emitting regions of the two first color sub-pixels, and the second direction is perpendicular to the first direction.

2. The display panel according to claim 1, wherein the first color sub-pixel is a green sub-pixel, and the first color light is a green light.

3. The display panel according to claim 1, wherein the display panel comprises a plurality of first pixel groups, each of the plurality of first pixel groups comprises first sub-pixel pairs arranged along the first direction, the plurality of first pixel groups are arranged along the second direction, and two adjacent first pixel groups are offset with respect to each other in the first direction;
a distance between the light-emitting regions of two adjacent first sub-pixel pairs arranged along the first direction is a first distance, a distance between the light-emitting regions of the two first color sub-pixels in each first sub-pixel pair is a second distance, and the first distance is greater than the second distance.

4. The display panel according to claim 3, wherein, in at least a part of the first sub-pixel pairs, the light-emitting regions of the two first color sub-pixels have a same shape, the light-emitting region of each first color sub-pixel comprises a first sub-region and a second sub-region connected with each other, the first sub-region and the second sub-region are arranged along the first direction, the first sub-region and the second sub-region have a same maximum size in the first direction, and the first sub-region and the second sub-region have different shapes.

5. The display panel according to claim 4, wherein, in the light-emitting region of the first color sub-pixel, an area of the first sub-region is smaller than an area of the second sub-region.

6. The display panel according to claim 4, wherein, in the first sub-pixel pair, the light-emitting regions of the two first color sub-pixels have a same arrangement direction of the first sub-region and the second sub-region.

7. The display panel according to claim 6, wherein, in one of two first sub-pixel pairs adjacent in the first direction, the arrangement directions of the first sub-region and the second sub-region in the light-emitting regions of the two first color sub-pixels are both first arrangement directions; and in the other of the two adjacent first sub-pixel pairs, the arrangement directions of the first sub-region and the second sub-region in the light-emitting regions of the two first color sub-pixels are both second arrangement directions, and an included angle between a first arrangement direction and a second arrangement direction is greater than 120 degrees.

8. The display panel according to claim 6, wherein, in two first sub-pixel pairs adjacent in the first direction, the arrangement directions of the first sub-region and the second sub-region in the light-emitting regions of all first color sub-pixels are the same.

9. The display panel according to claim 1, wherein the display panel comprises a plurality of first pixel groups, and each of the plurality of first pixel groups comprises first sub-pixel pairs arranged along the first direction;
in at least a part of the first sub-pixel pairs, the light-emitting regions of the two first color sub-pixels have a same shape, the light-emitting region of each first color sub-pixel comprises a first sub-region and a second sub-region connected with each other, the first sub-region and the second sub-region are arranged along the first direction, the first sub-region and the second sub-region have a same maximum size in the first direction, and an area of the first sub-region is smaller than an area of the second sub-region;
in one of two first sub-pixel pairs adjacent in the first direction, the arrangement directions of the first sub-region and the second sub-region in the light-emitting regions of the two first color sub-pixels are both first arrangement directions; and in the other of the two adjacent first sub-pixel pairs, the arrangement directions of the first sub-region and the second sub-region in the light-emitting regions of the two first color sub-pixels are both second arrangement directions, and an included angle between a first arrangement direction and a second arrangement direction is greater than 120 degrees;
in at least one first pixel group, in a case where two sub-regions close to each other in two adjacent first sub-pixel pairs are two first sub-regions, a distance between the two first sub-regions close to each other is a first sub-distance, and in a case where two sub-regions close to each other in two adjacent first sub-pixel pairs are two second sub-regions, a distance between the two second sub-regions close to each other is a second sub-distance, and the first sub-distance is less than the second sub-distance.

10. The display panel according to claim 5, wherein the shape of the light-emitting region of each first color sub-pixel comprises a pentagon, an end of the first sub-region farthest from the second sub-region comprises a vertex of a corner of the pentagon, and an end of the second sub-region farthest from the first sub-region comprises a side of the pentagon.

11. The display panel according to claim 1, wherein a maximum size of the light-emitting region of each first color sub-pixel in the first direction is a first size, a maximum size of the light-emitting region of each first color sub-pixel in the second direction is a second size, and the first size is greater than the second size.

12. The display panel according to claim 3, further comprising:
a spacer, disposed at a gap between the light-emitting regions of two first sub-pixel pairs adjacent in the first direction.

13. A display device, comprising the display panel according to claim 1.

14. The display panel according to claim 3, wherein the plurality of sub-pixels further comprise a plurality of second color sub-pixels and a plurality of third color sub-pixels;

the display panel further comprises a plurality of second pixel groups, each of the plurality of second pixel groups comprises second color sub-pixels and third color sub-pixels arranged along the first direction, the plurality of first pixel groups and the plurality of second pixel groups are alternately arranged along the second direction, and two adjacent second pixel groups are offset with respect to each other in the first direction;

the second color sub-pixel comprises a second light-emitting layer to emit a second color light, and the third color sub-pixel comprises a third light-emitting layer to emit a third color light;

the plurality of second color sub-pixels comprise a plurality of second sub-pixel pairs, each of the plurality of second sub-pixel pairs comprises two second color sub-pixels arranged along the first direction, and second light-emitting layers of the two second color sub-pixels in each second sub-pixel pair are integrated; the plurality of third color sub-pixels comprise a plurality of third sub-pixel pairs, each of the plurality of third sub-pixel pairs comprises two third color sub-pixels arranged along the first direction, and third light-emitting layers of the two third color sub-pixels in each third sub-pixel pair are integrated;

in each second pixel group, the second sub-pixel pairs and the third sub-pixel pairs are alternately arranged along the first direction.

15. The display panel according to claim 14, wherein, in each second sub-pixel pair, the light-emitting regions of the two second color sub-pixels are symmetrically distributed with respect to a first symmetry axis extending along the second direction; and/or, in each third sub-pixel pair, the light-emitting regions of two third color sub-pixels are symmetrically distributed with respect to a second symmetry axis extending along the second direction.

16. The display panel according to claim 14, wherein, in the first direction, a distance between the light-emitting regions of the second sub-pixel pair and the third sub-pixel pair adjacent to each other is a third distance, a distance between the light-emitting regions of the two second color sub-pixels in each second sub-pixel pair is a fourth distance, a distance between the light-emitting regions of the two third color sub-pixels in each third sub-pixel pair is a fifth distance, and both the fourth distance and the fifth distance are less than the third distance.

17. The display panel according to claim 14, further comprising:

a base substrate on which the plurality of sub-pixels are located, wherein each of the plurality of sub-pixels comprises an electrode located at one side of the light-emitting layer facing the base substrate, and a pixel circuit electrically connected with the electrode; an insulating layer is disposed between the pixel circuit and the electrode, and the electrode is electrically connected with the pixel circuit through a via hole located in the insulating layer.

18. The display panel according to claim 17, wherein, in the first color sub-pixel, a portion of the electrode overlapping with the light-emitting layer is electrically connected with the pixel circuit through the via hole; in the second color sub-pixel, a portion of the electrode not overlapping with the light-emitting layer is electrically connected with the pixel circuit through the via hole; in the third color sub-pixel, a portion of the electrode not overlapping with the light-emitting layer is electrically connected with the pixel circuit through the via hole.

19. The display panel according to claim 18, wherein, in each of the second color sub-pixel and the third color sub-pixel, the electrode comprises a main portion and a connection portion which are connected with each other, the main portion overlaps with the light-emitting layer, and the connection portion does not overlap with the corresponding light-emitting layer and is connected with the pixel circuit;

in the second sub-pixel pair, the connection portion is located at a side of the main portion connected with the connection portion away from a center of the sub-pixel pair; in the third sub-pixel pair, the connection portion is located at a side of the main portion connected with the connection portion away from a center of the sub-pixel pair.

20. The display panel according to claim 19, wherein a plurality of pixel circuits arranged along the second direction are electrically connected with the connection portion of the third color sub-pixel, the connection portion of the second color sub-pixel and the electrode of the first color sub-pixel in sequence; or, a plurality of pixel circuits arranged along the second direction are electrically connected with the connection portion of the second color sub-pixel, the connection portion of the third color sub-pixel and the electrode of the first color sub-pixel in sequence.

\* \* \* \* \*